United States Patent
Nemoto et al.

(10) Patent No.: US 7,027,115 B2
(45) Date of Patent: Apr. 11, 2006

(54) LIQUID CRYSTAL DISPLAY DEVICE

(75) Inventors: Souta Nemoto, Mobara (JP); Kazutoshi Yoshida, Mobara (JP); Masao Uehara, Mobara (JP); Noboru Hoshino, Mobara (JP); Yoshiaki Nakamura, Mobara (JP); Masayoshi Fujieda, Ohara (JP); Koji Hiraga, Mobara (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 0 days.

(21) Appl. No.: 10/779,602

(22) Filed: Feb. 18, 2004

(65) Prior Publication Data

US 2004/0160555 A1    Aug. 19, 2004

Related U.S. Application Data

(63) Continuation of application No. 09/828,210, filed on Apr. 9, 2001, now Pat. No. 6,697,137.

(30) Foreign Application Priority Data

May 15, 2000 (JP) .............................. 2000-141420

(51) Int. Cl.
*G02F 1/1335* (2006.01)
(52) U.S. Cl. ...................... 349/113; 349/121; 349/137; 349/82
(58) Field of Classification Search ................ 349/113, 349/114, 121, 117, 137, 122, 72, 82, 83, 5, 349/8, 10, 34, 37, 98

See application file for complete search history.

(56) References Cited

U.S. PATENT DOCUMENTS

| | | | |
|---|---|---|---|
| 5,673,127 A | 9/1997 | Takahara et al. | 349/140 |
| 5,724,112 A | 3/1998 | Yoshida et al. | 349/117 |
| 5,737,050 A | 4/1998 | Takahara et al. | 349/122 |
| 5,753,937 A | 5/1998 | Shimomaki et al. | 257/59 |
| 5,831,765 A | 11/1998 | Nakayama et al. | 359/464 |
| 5,875,008 A | 2/1999 | Takahara et al. | 349/5 |
| 6,005,651 A | 12/1999 | Takahara et al. | 349/137 |
| 6,049,364 A | 4/2000 | Takahara et al. | 349/10 |
| 6,084,650 A | 7/2000 | Sekiguchi | 349/106 |
| 6,218,679 B1 | 4/2001 | Takahara et al. | 257/59 |
| 6,514,649 B1 * | 2/2003 | Sakaguchi | 430/47 |
| 6,529,255 B1 * | 3/2003 | Sekiguchi | 349/113 |

FOREIGN PATENT DOCUMENTS

| | | |
|---|---|---|
| JP | 7-234406 | 9/1995 |
| JP | 10-282488 | 10/1998 |
| JP | 11-52366 | 2/1999 |
| JP | 11-084358 | 3/1999 |
| JP | 11-183892 | 7/1999 |
| JP | 2000-105371 | 4/2000 |

* cited by examiner

*Primary Examiner*—Nathan J. Flynn
*Assistant Examiner*—Scott R Wilson
(74) *Attorney, Agent, or Firm*—Antonelli, Terry, Stout and Kraus, LLP.

(57) ABSTRACT

A liquid crystal display device includes a first transparent substrate having a plurality of electrodes, a second transparent substrate, a liquid crystal interposed between the first transparent substrate and the second transparent substrate, an illumination light source disposed on a back side of the first transparent substrate, pixel regions arranged in a matrix, and a reflecting film formed between the first transparent substrate and the electrodes. The reflecting film has at least one light transmission aperture in each pixel region and without slits at positions corresponding to gaps between adjacent ones of the pixel regions.

10 Claims, 7 Drawing Sheets

LIQUID CRYSTAL DISPLAY DEVICE

CROSS REFERENCE TO RELATED APPLICATION

This is a continuation of U.S. application Ser. No. 09/828,210, filed Apr. 9, 2001, now U.S. Pat. No. 6,697,137, the subject matter of which is incorporated by reference herein.

BACKGROUND OF THE INVENTION

The present invention relates to a semi-transmission/reflection-type liquid crystal display device that displays an image by selectively using transmission light and reflection light.

Being thin, light, and low in power consumption, liquid crystal display devices in which a liquid crystal display panel is used as an image generating means are employed as display devices in a wide variety of electronic equipment, such as notebook-sized personal computers, word processors, electronic notes, cellular phones, and camera-incorporated video recorders.

In contrast to CRTs and plasma display panels, liquid crystal display panels display an image by controlling the quantity of light that has entered the panel from the outside instead of emitting light by itself. When equipped with color filters of plural colors as light control elements, liquid crystal display panels can display a color image of multiple colors.

Liquid crystal display devices that are used most commonly at present are transmission-type devices in which an illumination light source, called a backlight that uses a fluorescent tube, is provided on the back side of a liquid crystal panel, and an image is displayed by controlling the quantity of light (part of light emitted from the backlight) that passes through the liquid crystal panel.

However, in such transmission-type liquid crystal display devices, the power consumption of the backlight accounts for approximately one half of the total power consumption. This is a major factor in shortening the usable time in a case where portable electronic apparatuses as exemplified above are of a battery-driven type. Transmission-type liquid crystal display devices have another problem, in that, when they are used in a bright outdoor environment, for example, ambient light is reflected by the surface of the display area and a displayed image becomes hard to recognize.

Among liquid crystal display devices that are always used in a carried state in a bright environment such as found outdoors, there are reflection-type liquid crystal display devices that usually do not use a backlight, but are equipped with a reflection plate, and control the quantity of reflection light (part of ambient light) with the liquid crystal layer. An example of such liquid crystal display devices is one that performs both transmission-type display and reflection-type display using a semitransparent reflecting film (e.g., Japanese Unexamined Patent Publication No. Hei. 7-333598).

Another example of the above type of liquid crystal display device is one in which each pixel electrode is composed of two regions that comprise a reflection region and a transmission region (e.g., Japanese Unexamined Patent Publication No. Hei. 7-333598).

However, in the above conventional liquid crystal display devices, the display quality varies depending on the use environment (light-source-related environment). That is, a display that is performed by using reflection light (reflection light mode) and a display that is performed by using transmission light (transmission light mode) having different contrast ratios. Further, a coloration phenomenon may occur in black-and-white display and hue deviation may occur in color display. The difference in contrast ratio is caused by the fact that the black display luminance (off transmittance) and the white display luminance (on transmittance) are different between the case where reflection light is used and the case where transmission light is used. This phenomenon lowers the legibility of a displayed image. The hue deviation is a phenomenon that the hue shifts to the bluish side particularly in the case where transmission light is used. This deteriorates the color reproduction performance.

SUMMARY OF THE INVENTION

The present invention has been made to solve the above problems in the art, and an object of the invention is therefore to provide a liquid crystal display device which is capable of image display with a large contrast ratio in both a transmission display mode and a reflection display mode, as well as being capable of good color display in both display modes.

To attain the above object, the invention provides the following configuration. A liquid crystal is interposed between a first transparent substrate having first electrodes and a second transparent substrate having other electrodes that are opposed to the first electrodes. Pixel regions are formed at portions where the first electrodes and the other electrodes are opposed to each other. A semitransparent reflecting film (or an opaque reflecting film) is formed between the first transparent substrate and the first electrodes. The semitransparent reflecting film is formed with light transmission apertures in each pixel region. Or, the semitransparent reflecting film is formed with slits at positions corresponding to the gaps between adjacent pixel regions. With the above measure, part of the illumination light that comes from the first transparent substrate side is introduced to the liquid crystal through the light transmission apertures or the slits.

An opaque reflecting film may be formed instead of a semitransparent reflecting film. In the case of an opaque reflecting film, the combination of the opaque reflecting film and the light transmission apertures serves as the above-mentioned "semitransparent reflecting film." In the case of the semitransparent reflecting film, the semitransparent reflecting film itself and the light transmission apertures serve as the above-mentioned "semitransparent reflecting film." The same interpretation applies to the term "semitransparent reflecting film" that will be used in the following description and embodiments.

With the above configuration, in the transmission light mode, part of the light that comes from the outside of the first transparent substrate is output from the second transparent substrate after passing through color filters. Therefore, not only is the legibility of a display image improved, but also a hue deviation in transmission light is decreased, which improves the color reproduction performance.

Where the semitransparent reflecting film also occupies the portions corresponding to the gaps between the adjacent pixel regions, the contrast in the transmission light mode is increased.

The peripheral portions of adjacent ones of color filter layers that are formed between the second transparent substrate and the other electrodes may overlap with each other to provide a light shield function. Since the overlapping portions of the color filter layers serve as light shield layers, the contrast is increased.

A light absorption film may be formed under the slits that are formed on the side of the first transparent substrate, or the slits may be charged with a light absorption film. This prevents color mixture between adjacent pixels and hence increases the contrast.

A semi-transmission/reflection-type liquid crystal display device is constructed by disposing an illumination light source on the back side of the first transparent substrate of the above liquid crystal display panel. In an environment where the brightness is sufficiently high, the semi-transmission/reflection-type liquid crystal display device is used in the reflection light mode by turning off the illumination light source. In a dark environment, it is used in the transmission light mode by turning on the illumination light source. The color reproduction performance is improved in either mode.

In the semi-transmission/reflection-type liquid crystal display device using the above liquid crystal display panel, an upper polarizer and a lower polarizer are formed on the display screen side (i.e., the second transparent substrate side) of the liquid crystal display panel and on the side opposite to it (i.e., the first transparent substrate side), respectively, and their optical absorption axes (polarizing axes) are set approximately perpendicular to each other.

A first alignment layer is formed on the inside surface of the substrate (first transparent substrate) provided on the illumination light incidence side (in the transmission light mode), and the alignment axis of the first alignment layer and the absorption axis of the lower polarizer are set approximately parallel with each other. The black display luminance (off transmittance) that is obtained when black display voltages are applied to the pixel electrodes of the liquid crystal display panel is made low and the white display luminance (on transmittance) that is obtained when white display voltage are applied to the pixel electrodes is made high, whereby the contrast ratio of a display image is increased irrespective of the display mode.

A first upper phase plate and a second upper phase plate are formed on the substrate provided on the display screen side of the liquid crystal display panel and their drawing axes are deviated from each other by about 30° (30°±20°), whereby light that has passed through the liquid crystal layer is converted into approximately linearly polarized light. This prevents a coloration phenomenon in black-and-white display and hue deviation in color display (neutralization of display color) and thereby enables high-quality color reproduction that is free of hue deviation.

Typical configurations according to the invention are as follows.

(1) A liquid crystal display device comprising:
a first transparent substrate having a plurality of first electrodes;
a second transparent substrate having a plurality of second electrodes (other electrodes) that are opposed to the first electrodes;
a liquid crystal interposed between the first transparent substrate and the second transparent substrate;
an illumination light source disposed on the back side of the first transparent substrate;
pixel regions formed at portions where the first electrodes and the second electrodes are opposed to each other; and
a reflecting film formed between the first transparent substrate and the first electrodes, the reflecting film having one or a plurality of light transmission apertures in each pixel region and not having slits at positions corresponding to gaps between adjacent ones of the pixel regions.

(2) In configuration (1), color filter layers are further provided between the second transparent substrate and the second electrodes, and peripheral portions of adjacent ones of the color filter layers overlap with each other at positions corresponding to the gaps between adjacent ones of the pixel regions.

(3) A liquid crystal display device comprising:
a first transparent substrate having a plurality of first electrodes;
a second transparent substrate having a plurality of second electrodes that are opposed to the first electrodes;
a liquid crystal interposed between the first transparent substrate and the second transparent substrate;
illumination light source disposed on the back side of the first transparent substrate;
pixel regions formed at portions where the first electrodes and the second electrodes are opposed to each other;
a reflecting film formed between the first transparent substrate and the first electrodes, the reflecting film having one or a plurality of light transmission apertures in each pixel region and slits at positions corresponding to gaps between adjacent ones of the pixel regions; and
a light absorption film formed between the first transparent substrate and the reflecting film at positions corresponding to the slits.

(4) A liquid crystal display device comprising:
a first transparent substrate having a plurality of first electrodes;
a second transparent substrate having a plurality of second electrodes that are opposed to the first electrodes;
a liquid crystal interposed between the first transparent substrate and the second transparent substrate;
illumination light source disposed on the back side of the first transparent substrate;
pixel regions formed at portions where the first electrodes and the second electrodes are opposed to each other;
a reflecting film formed between the first transparent substrate and the first electrodes, the reflecting film having one or a plurality of light transmission apertures in each pixel region and slits at positions corresponding to gaps between adjacent ones of the pixel regions; and
a light absorption film with which the slits are charged.

(5) In each of configurations (I)–(4), the reflecting film is an opaque reflecting film.

(6) In each of configurations (1)–(4), the reflecting film is a semitransparent reflecting film.

(7) A liquid crystal is interposed between a first transparent substrate having first electrodes and a second transparent substrate having other electrodes that are opposed to the first electrodes. Pixel regions are formed at portions where the first electrodes and the other electrodes are opposed to each other. A semitransparent reflecting film that is formed with light transmission apertures in each pixel region is formed between the first transparent substrate and the first electrodes.

(8) Color filter layers in which the peripheral portions of the adjacent color filter layers overlap with each other are provided between the first transparent substrate and the first electrodes and the overlapping peripheral portions serve as light shield films located at positions corresponding to the gaps between adjacent pixel regions.

(9) A liquid crystal is interposed between a first transparent substrate having first electrodes and a second transparent substrate having other electrodes that are opposed to the first electrodes. Pixel regions are formed at portions where the first electrodes and the other electrodes are opposed to each other. A semitransparent reflecting film that is formed with light transmission apertures on each pixel region and slits extending along the peripheries of the pixel regions are formed between the first transparent substrate and the first electrodes.

(10) A light absorption film is formed under the slits (i.e., on the side of the first transparent substrate), or the slits are charged with a light absorption film.

(11) A semi-transmission/reflection-type liquid crystal display device is constructed by disposing an illumination light source on the back side of the first transparent substrate of the liquid crystal display panel of each of configurations (7)–(10).

(12) In configuration (11), an upper polarizer and a lower polarizer whose absorption axes (polarizing axes) are set approximately perpendicular to each other are formed on the surface on the second transparent substrate side and the surface on the first transparent substrate side, respectively. A first alignment layer and a second alignment layer are formed at the boundaries between the liquid crystal and the inside surfaces of the first transparent substrate and the second transparent substrate, respectively, and the alignment axis of the first alignment layer and the absorption axis of the lower polarizer are set approximately parallel with each other. A first upper phase plate and a second upper phase plate whose drawing axes are deviated from each other by about 30° (30°±20°) are formed on the outside surface of the second transparent substrate.

With the above configuration, the black display luminance (off transmittance) that is obtained when a black display voltage is applied to the first pixel electrodes and the other pixel electrodes of the liquid crystal display panel is made low and the white display luminance (on transmittance) that is obtained when white display voltages are applied to the pixel electrodes is made high, whereby the contrast ratio of a display image is increased irrespective of the display mode. Therefore, the legibility is improved and a high-quality liquid crystal display panel can be realized.

A diffusion layer is provided between the first upper phase plate and the second upper phase plate. A known diffusion sheet may be used as the diffusion layer. However, if the diffusion layer is formed by mixing light diffusing particles into an adhesive for bonding the first and second upper phase plates to each other, the optical loss is minimized and bright display can thereby be attained.

Each of the above configurations makes it possible to produce a bright, clear image having a large contrast ratio or a high-quality color image that is free of hue deviation in both an environment having bright ambient light and a dark environment by selectively using transmission light and reflection light.

The invention is not limited to the above configurations or the embodiments described below. It goes without saying that various modifications are possible without departing from the spirit and scope of the invention.

BRIEF DESCRIPTION OF THE DRAWINGS

FIGS. 1A and 1B are schematic diagrams showing the configuration of a liquid crystal display panel according to a first embodiment of the present invention, in which FIG. 1A is a sectional view of its main part and FIG. 1B is a plan view of the main part of a first transparent substrate as viewed in the direction indicated by arrows A in FIG. 1A;

FIGS. 2A and 2B are schematic diagrams showing the configuration of a liquid crystal display panel according to a second embodiment of the invention, in which FIG. 2A is a sectional view of its main part and FIG. 2B is a plan view of the main part of a first transparent substrate as viewed in the direction indicated by arrows B in FIG. 2A;

FIGS. 3A and 3B are schematic diagrams showing the configuration of a liquid crystal display panel according to a third embodiment of the invention, in which FIG. 3A is a sectional view of its main part and FIG. 3B is a plan view of the main part of a first transparent substrate as viewed in the direction indicated by arrows C in FIG. 3A;

FIGS. 4A and 4B are schematic diagrams showing the configuration of a liquid crystal display panel according to a fourth embodiment of the invention, in which FIG. 4A is a sectional view of its main part and FIG. 4B is a plan view of the main part of a first transparent substrate as viewed in the direction indicated by arrows D in FIG. 4A;

DESCRIPTION OF THE PREFERRED EMBODIMENTS

Liquid crystal display panels according to embodiments of the present invention will be hereinafter described in detail with reference to the accompanying drawings.

Figure 1A:
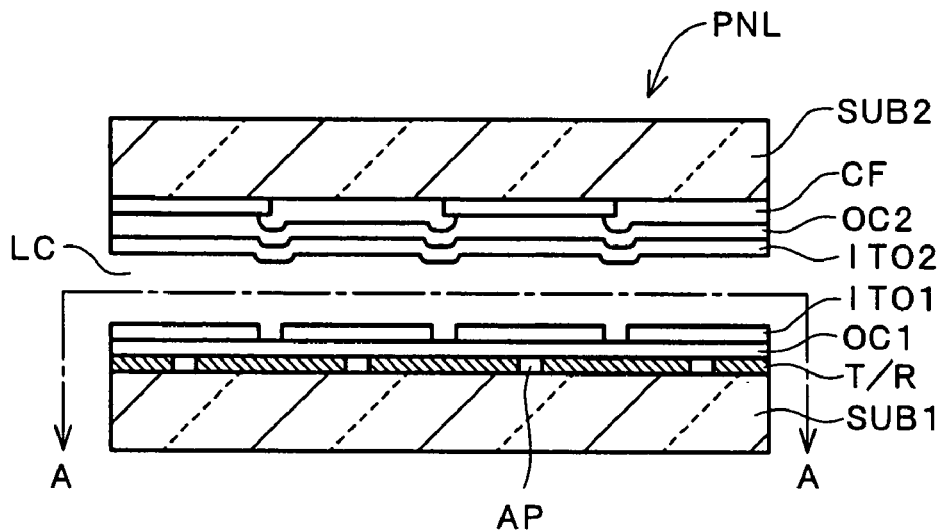
Figure 1B:
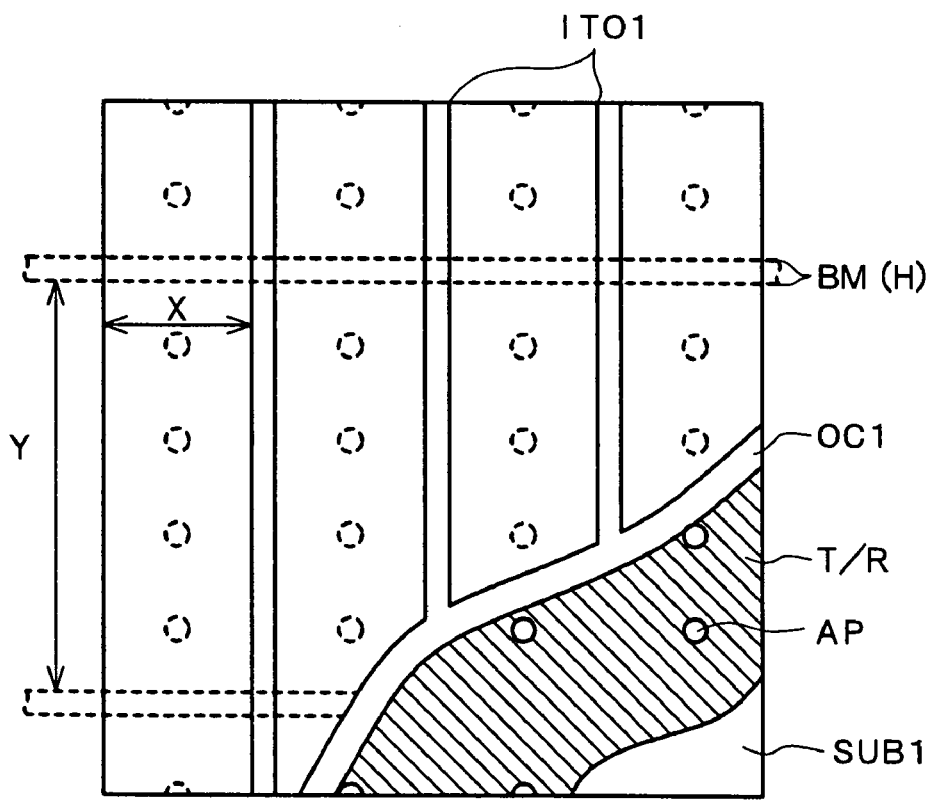

FIGS. 1A and 1B are schematic diagrams showing the configuration of a liquid crystal display panel according to a first embodiment of the invention. FIG. 1A is a sectional view of its main part and FIG. 1B is a plan view of the main part of a first transparent substrate as viewed in the direction indicated by arrows A in FIG. 1A. Alignment layers that determine the initial alignment of a liquid crystal, polarizers, and phase plates are not shown in FIGS. 1A and 1B.

The liquid crystal display panel PNL is of a passive matrix type (STN-LCD) in which a liquid crystal layer (also referred to simply as "liquid crystal") LC is interposed between a first transparent substrate SUB1 and a second transparent substrate SUB2.

The first transparent substrate SUB1 is a hard plate, more specifically, a glass plate in this embodiment. A semitransparent reflecting film T/R is formed on the inside surface of the first transparent substrate SUB1. A plurality of first electrodes (transparent pixel electrodes) ITO1 that constitute pixels are formed parallel with each other on the semitransparent reflecting film T/R with an overcoat layer OC1 interposed inbetween. The first electrodes ITO1 may be made of ITO (indium tin oxide) or IZO (indium zinc oxide). ITO is employed in this embodiment. A lower alignment layer (not shown) is formed so as to cover the first electrodes ITO1 and is subjected to alignment processing, such as rubbing.

The second transparent substrate SUB2 is also a glass plate. Color filters CF of three colors (e.g., R, G, and B) are formed on the inside surface of the second transparent substrate SUB2 at such positions as to be opposed to the first electrodes ITO1. Adjacent ones of the color filters CF overlap with each other, whereby a light shield function (i.e., a function of a vertical black matrix (vertical BM)) is obtained. The overlap width is set approximately equal to the width of each of the first electrodes ITO1.

An overcoat layer OC2 is formed so as to cover the color filters CF, and the other electrodes ITO2 are formed on the overcoat layer OC2 (on the side of the liquid crystal LC). The other electrodes ITO2 are made of the same conductive material as that of the first electrodes ITO1.

The other electrodes ITO2 are disposed so as to cross the first electrodes ITO1 that are formed on the first transparent substrate SUB1. Unit pixels are formed at the crossing portions.

Symbol BM(H) in FIG. 1B denotes horizontal light shield films (horizontal BM) that are formed on the second transparent substrate SUB2 so as to traverse the other electrodes ITO2. Each region that is enclosed by the vertical BM and the horizontal BM and has an area X×Y is a pixel region of one color (i.e., a unit pixel) corresponding to one color filter.

The semitransparent reflecting film T/R is formed on the first transparent substrate SUB1 with an Al alloy or an Ag alloy basically over the entire surface and has several light transmission apertures AP in each pixel region having the area X×Y. Although in this embodiment four circular light transmission apertures AP are formed in each pixel region, the number and the shape of light transmission apertures AP are arbitrary, as will be described later.

The liquid crystal LC that is interposed between the first transparent substrate SUB1 and the second transparent substrate SUB2 is an STN (super twisted nematic) liquid crystal.

In this embodiment, the color filters CF are formed on the second transparent substrate SUB2 by a photolithography process using a pigment-dispersed resist. However, the color filters CF may be formed by other known methods, such as a method in which coloring is performed by using dyes as dyeing agents, an ink jetting method, and a method of attaching color sheets on which three colors are printed in advance.

The overcoat layers OC1 and OC2 are provided for such purposes as preventing deterioration in the quality of the semitransparent reflecting film T/R, the color filters CF, and the material of the liquid crystal LC and securing uniform alignment of the liquid crystal LC by planarizing the surfaces. Examples of the material of the overcoat layers OC1 and OC2 are a thermosetting acrylic resin, an urethane resin, a polyglycidyl methacrylate resin, and a silica-type inorganic material.

As described above, according to the embodiment, the light transmission apertures AP are formed in the semitransparent reflecting film T/R, whereby the luminance in the transmission light mode is increased. The circular shape of the light transmission apertures AP minimizes a variation in forming the semitransparent reflecting film T/R by photolithography and etching, whereby the area of the light transmission apertures AP can be uniformized easily.

Since the semitransparent reflecting film T/R occupies the gaps between the first electrodes ITO1 operating as the pixel electrodes (i.e., there are no slits in the semitransparent reflecting film T/R at positions corresponding to the gaps between the adjacent pixel regions), when a backlight that is provided on the back side of the liquid crystal display panel is turned on, leakage of light through the gaps between the first electrodes ITO1 can be prevented. This increases the contrast in the transmission light mode.

Figure 2A:
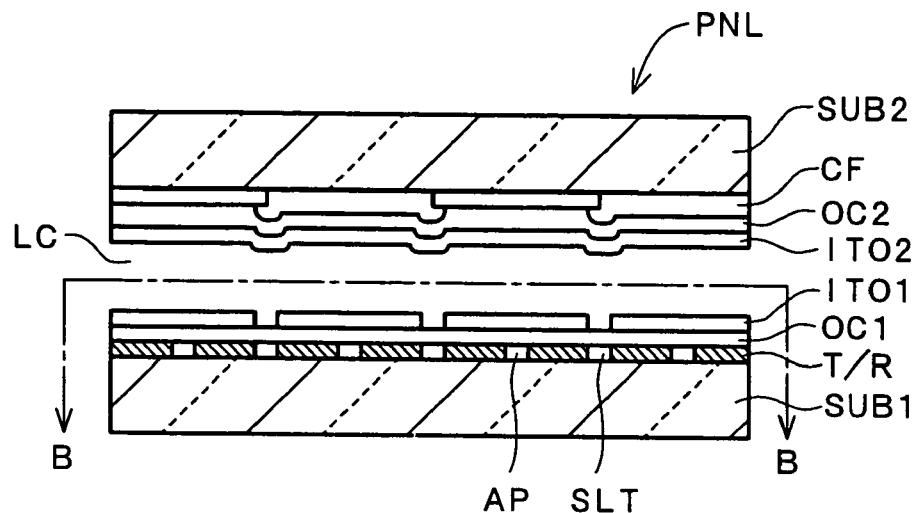
Figure 2B:
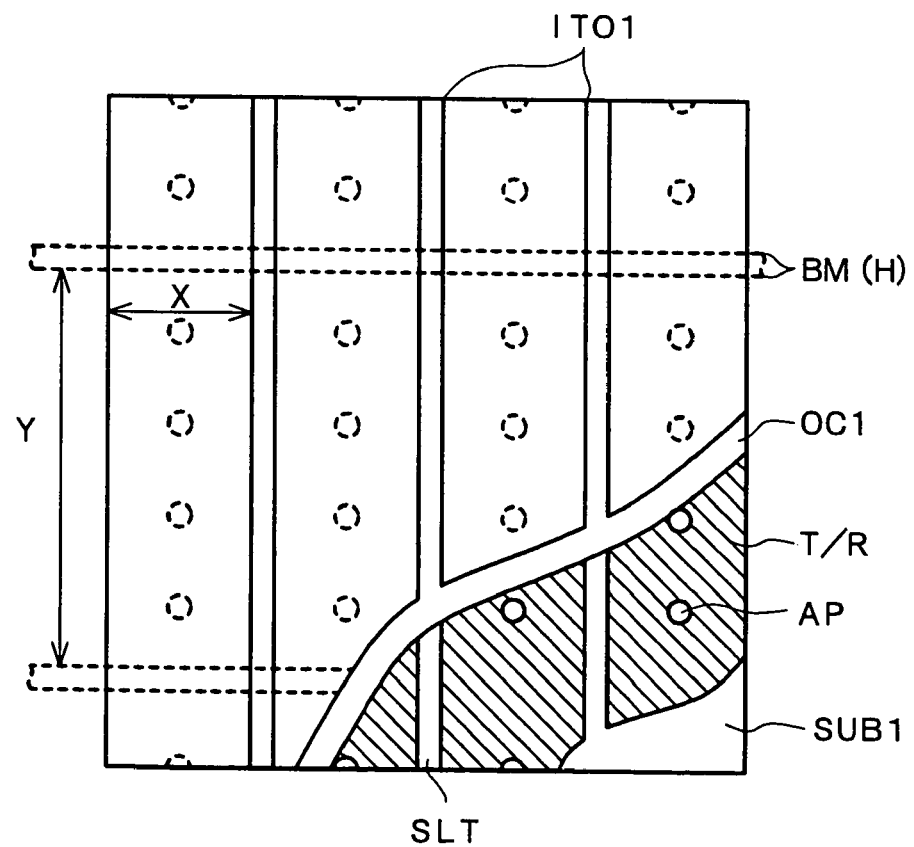

FIGS. 2A and 2B are schematic diagrams showing the configuration of a liquid crystal display panel according to a second embodiment of the invention. FIG. 2A is a sectional view of its main part and FIG. 2B is a plan view of the main part of a first transparent substrate as viewed in the direction indicated by arrows B in FIG. 2A. Alignment layers that determine the initial alignment of a liquid crystal, polarizers, and phase plates are not shown in FIGS. 2A and 2B.

As in the case of the first embodiment, the liquid crystal display panel PNL is of a passive matrix type (STN-LCD) in which a liquid crystal LC is interposed between a first transparent substrate SUB1 and a second transparent substrate SUB2.

As in the case of the first embodiment, both the first transparent substrate SUB1 and the second transparent substrate SUB2 are provided in the form of a glass plate. A semitransparent reflecting film T/R is formed on the inside surface of the first transparent substrate SUB1. A plurality of first electrodes ITO1 that constitute pixels are formed parallel with each other on the semitransparent reflecting film T/R with an overcoat layer OC1 interposed in between. As in the case of the first embodiment, the first electrodes ITO1 are made of ITO. A lower alignment layer (not shown) is formed so as to cover the first electrodes ITO1 and is subjected to alignment processing, such as rubbing.

Color filters CF of three colors (e.g., R, G, and B) are formed on the inside surface of the second transparent substrate SUB2 at such positions as to be opposed to the first electrodes ITO1. Adjacent ones of the color filters CF overlap with each other, whereby a light shield function (i.e., a function of a vertical black matrix (vertical BM)) is obtained. The overlap width is set approximately equal to the width of each of the first electrodes ITO 1.

An overcoat layer OC2 is formed so as to cover the color filters CF, and the other electrodes ITO2 are formed on the overcoat layer OC2 (on the side of the liquid crystal LC). The other electrodes ITO2 are made of the same conductive material as that of the first electrodes ITO1.

The other electrodes ITO2 are disposed so as to cross the first electrodes ITO1 that are formed on the first transparent substrate SUB1. Unit pixels are formed at the crossing portions.

Symbol BM(H) in FIG. 2B denotes horizontal light shield films (horizontal BM) that are formed on the second transparent substrate SUB2 so as to traverse the other electrodes ITO2. Each region that is enclosed by the vertical BM and the horizontal BM and has an area X×Y is a pixel region of one color (i.e., a unit pixel) corresponding to one color filter.

The semitransparent reflecting film T/R is formed on the first transparent substrate SUB1 with the same material as used in the first embodiment, and is formed with slits SLT at positions corresponding to the gaps between adjacent first electrodes ITO1. That is, the semitransparent reflecting film T/R is divided into portions corresponding to the pixel regions.

The semitransparent reflecting film T/R has several light transmission apertures AP in each pixel region having the area X×Y. Although in this embodiment four circular light transmission apertures AP are formed in each pixel region, the number and the shape of light transmission apertures AP are arbitrary, as will be described later.

The liquid crystal LC that is interposed between the first transparent substrate SUB1 and the second transparent substrate SUB2 is an STN (super twisted nematic) liquid crystal.

In this embodiment, the color filters CF are formed on the second transparent substrate SUB2 by a photolithography process using a pigment-dispersed resist. However, the color filters CF may be formed by other known methods, such as a method in which coloring is performed by using dyes as dyeing agents, an ink setting method, and a method of attaching color sheets on which three colors are printed in advance.

The overcoat layers OC1 and OC2 are provided for such purposes as preventing deterioration in the quality of the semitransparent reflecting film T/R, the color filters CF, and the material of the liquid crystal LC and securing uniform alignment of the liquid crystal LC by planarizing the surfaces. Examples of the material of the overcoat layers OC1 and OC2 are a thermosetting acrylic resin, an urethane resin, a polyglycidyl methacrylate resin, and a silica-type inorganic material.

As described above, according to the embodiment, the light transmission apertures AP are formed in the semitransparent reflecting film T/R, whereby the luminance in the transmission light mode is increased. The circular shape of the light transmission apertures AP minimizes a variation in forming the semitransparent reflecting film T/R by photolithography and etching, whereby the area of the light transmission apertures AP can be uniformized easily.

Since the slits SLT are formed in the semitransparent reflecting film T/R at the positions corresponding to the gaps between the one electrodes ITOI as the pixel electrodes (i.e., the gaps between the adjacent pixel regions: slits), when a backlight that is provided on the back side of the liquid crystal display panel is turned on, part of the light emitted from the backlight can be introduced into the liquid crystal LC. This increases the brightness in the transmission light mode.

Figure 3A:
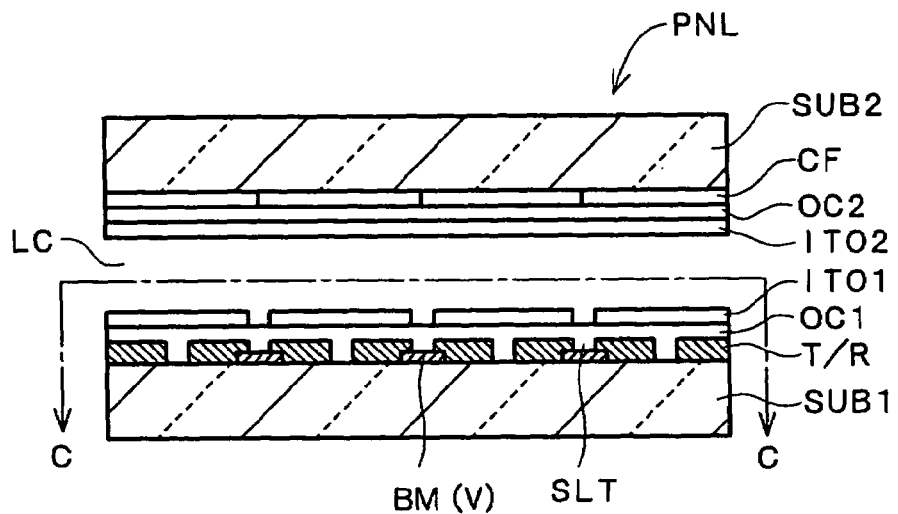
Figure 3B:
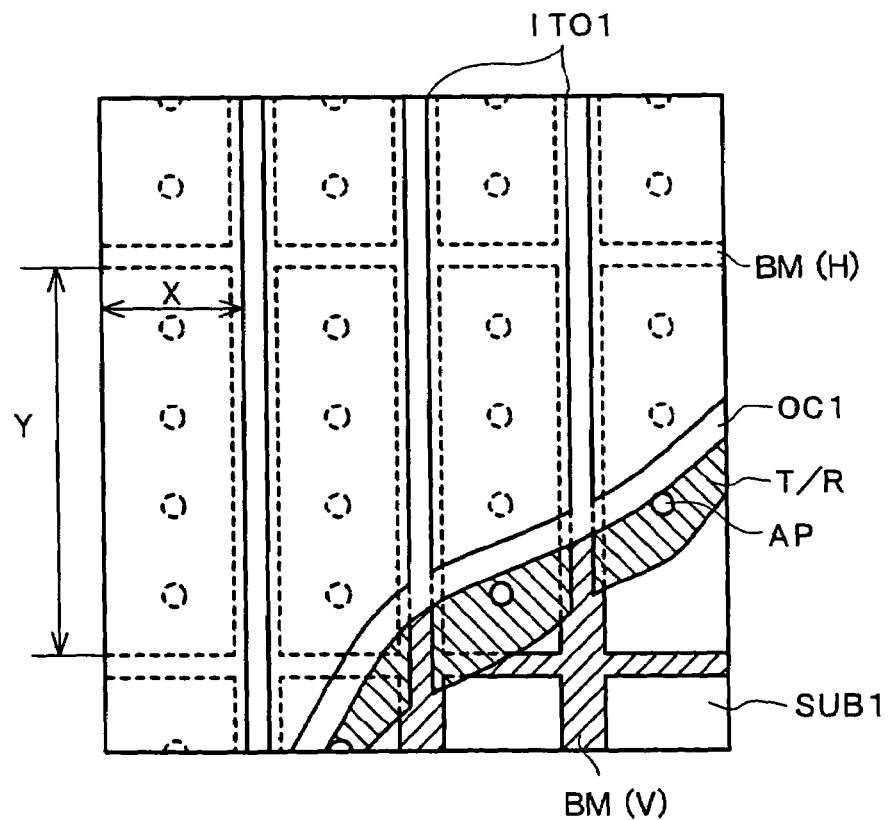

FIGS. 3A and 3B are schematic diagrams showing the configuration of a liquid crystal display panel according to a third embodiment of the invention. FIG. 3A is a sectional view of its main part and FIG. 3B is a plan view of the main part of a first transparent substrate as viewed in the direction indicated by arrows C in FIG. 3A. Alignment layers that determine the initial alignment of a liquid crystal, polarizers, and phase plates are not shown in FIGS. 3A and 3B.

As in the case of the first and second embodiments, the liquid crystal display panel PNL is of a passive matrix type (STN-LCD) in which a liquid crystal LC is interposed between a first transparent substrate SUB1 and a second transparent substrate SUB2.

As in the case of the first and second embodiments, both of the first transparent substrate SUBI and the second transparent substrate SUB2 are provided as a glass plate. A semitransparent reflecting film T/R is formed on the inside surface of the first transparent substrate SUB1. A plurality of first electrodes ITO1 that constitute pixels are formed parallel with each other on the semitransparent reflecting film T/R with an overcoat layer OCI interposed in between. As in the case of the first and second embodiments, the one electrodes ITO1 are made of ITO. A lower alignment layer (not shown) is formed so as to cover the first electrodes ITO1 and is subjected to alignment processing, such as rubbing.

Color filters CF of three colors (e.g., R, G, and B) are formed on the inside surface of the second transparent substrate SUB2 at such positions as to be opposed to the first electrodes ITO1.

An overcoat layer OC2 is formed so as to cover the color filters CF, and the other electrodes ITO2 are formed on the overcoat layer OC2 (on the side of the liquid crystal LC). The other electrodes ITO2 are made of the same conductive material as that of the first electrodes ITO1.

The other electrodes ITO2 are disposed so as to cross the first electrodes ITO1 that are formed on the first transparent substrate SUB1. Unit pixels are formed at the crossing portions.

A light shield film (black matrix BM) consisting of a horizontal BM (BM(H)) and a vertical BM (BM(V)) is formed on the first transparent substrate SUB1. Each region that is enclosed by the horizontal BM (BM(H)) and the vertical BM (BM(V)) and has an area X×Y is a pixel region of one color (i.e., a unit pixel) corresponding to one color filter.

The semitransparent reflecting film T/R is formed on the light shield film BM that is formed on the first transparent substrate SUB1. The semitransparent reflecting film T/R is made of the same material as used in the first and second embodiments, and is formed with slits SLT at positions corresponding to the gaps between the adjacent first electrodes ITO1. The slits SLT expose parts of the light shield film BM, and the exposed parts of the light shield film BM separate the pixel regions. The light shield film BM can be formed by a known photolithography technique in which a light shield material mixed with a photoresist is applied and then exposed to light through a photomask having a prescribed opening pattern. The light shield film BM can also be formed by screen printing.

In this embodiment, the effective width (optical width) of the light shield film BM is determined by the processing accuracy in forming the slits SLT later in the semitransparent reflecting film T/R. Therefore, satisfactory results are obtained as long as the width of the light shield film BM is larger than the width of the gaps between the adjacent first electrodes ITO1 that are formed on the overcoat layer OC1. For this reason, the light shield film BM need not be formed with high accuracy, and hence the above-mentioned printing method is sufficient.

The semitransparent reflecting film T/R has several light transmission apertures AP in each pixel region having the area X×Y. Although in this embodiment four circular light transmission apertures AP are formed in each pixel region, the number and the shape of light transmission apertures AP are arbitrary, as will be described later.

The liquid crystal LC that is interposed between the first transparent substrate SUB1 and the second transparent substrate SUB2 is an STN (super twisted nematic) liquid crystal.

In this embodiment, the color filters CF are formed on the second transparent substrate SUB2 by a photolithography process using a pigment-dispersed resist. However, the color filters CF may be formed by other known methods, such as a method in which coloring is performed by using dyes as dyeing agents, an ink jetting method, and a method of attaching color sheets on which three colors are printed in advance.

The overcoat layers OC1 and OC2 are provided for such purposes as preventing deterioration in the quality of the semitransparent reflecting film T/R, the light shield film BM, the color filters CF, and the material of the liquid crystal LC and securing uniform alignment of the liquid crystal LC by planarizing the surfaces. Examples of the material of the overcoat layers OC1 and OC2 are a thermosetting acrylic resin, an urethane resin, a polyglycidyl methacrylate resin, and a silica-type inorganic material.

As described above, according to the embodiment, the light transmission apertures AP are formed in the semitransparent reflecting film T/R, whereby the luminance in the transmission light mode is increased. The circular shape of the light transmission apertures AP minimizes a variation in forming the semitransparent reflecting film T/R by photolithography and etching, whereby the area of the light transmission apertures AP can be uniformized easily.

Since the slits SLT are formed in the semitransparent reflecting film T/R at the positions corresponding to the gaps between the first electrodes ITO1 operating as the pixel electrodes (i.e., the gaps between the adjacent pixel regions: slits) and the light shield film BM is formed in association with the slits SLT, when a backlight that is provided on the back side of the liquid crystal display panel is turned on, leakage of light that is emitted from the backlight is prevented and light beams of adjacent pixel regions can be separated from each other, leading to an increase in contrast.

Figure 4A:
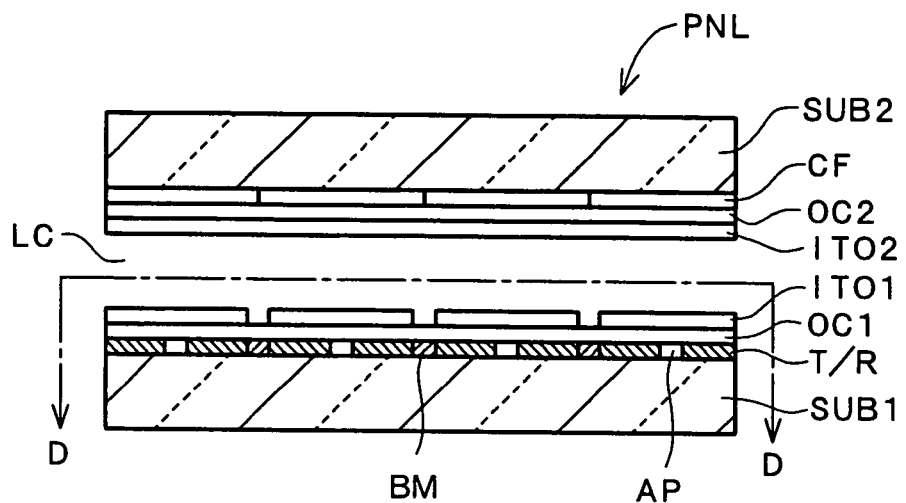
Figure 4B:
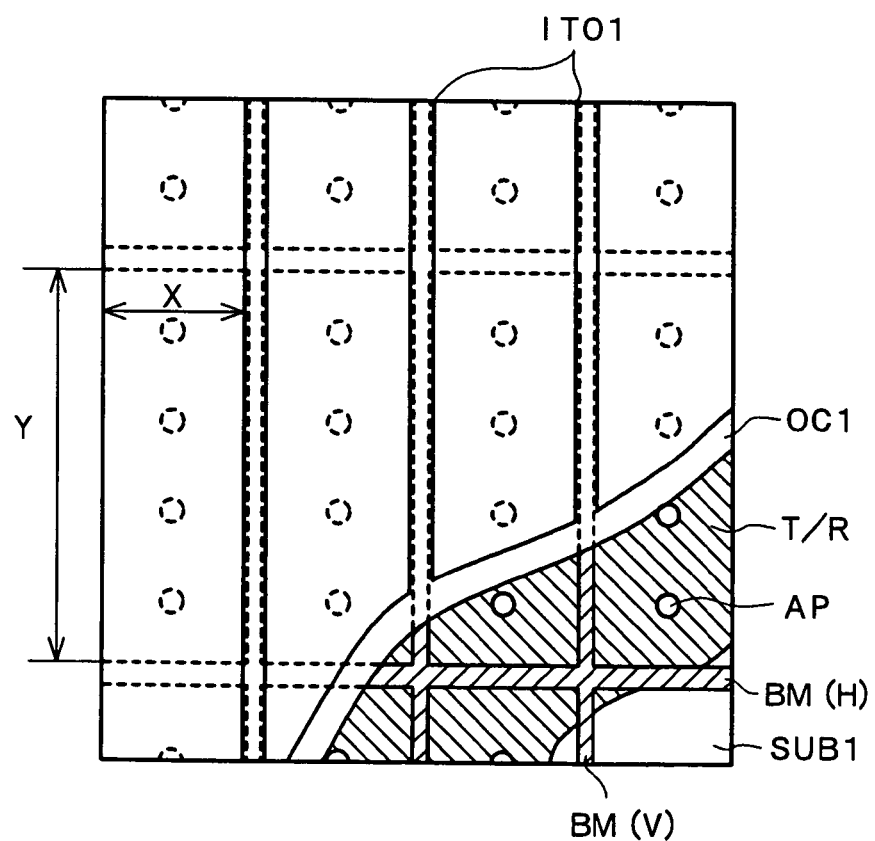

FIGS. 4A and 4B are schematic diagrams showing the configuration of a liquid crystal display panel according to a fourth embodiment of the invention. FIG. 4A is a sectional view of its main part and FIG. 4B is a plan view of the main part of a first transparent substrate as viewed in the direction indicated by arrows D in FIG. 4A. Alignment layers that determine the initial alignment of a liquid crystal, polarizers, and phase plates are not shown in FIGS. 4A and 4B.

As in the case of the first to third embodiments, the liquid crystal display panel PNL is of a passive matrix type (STN-LCD) in which a liquid crystal LC is interposed between a first transparent substrate SUB1 and a second transparent substrate SUB2.

As in the case of the first to third embodiments, both of the first transparent substrate SUB1 and the second transparent substrate SUB2 are provided in the form of a glass plate. A semitransparent reflecting film T/R is formed on the inside surface of the first transparent substrate SUB1. A plurality of first electrodes ITO1 that constitute pixels are formed parallel with each other on the semitransparent reflecting film T/R with an overcoat layer OC1 interposed in between. As in the case of the first to third embodiments, the first electrodes ITO1 are made of ITO. A lower alignment layer (not shown) is formed so as to cover the first electrodes ITO1 and is subjected to alignment processing, such as rubbing.

Color filters CF of three colors (e.g., R, G, and B) are formed on the inside surface of the second transparent substrate SUB2 at such positions as to be opposed to the first electrodes ITO1.

An overcoat layer OC2 is formed so as to cover the color filters CF, and the other electrodes ITO2 are formed on the overcoat layer OC2 (on the side of the liquid crystal LC). The other electrodes ITO2 are made of the same conductive material as that of the first electrodes ITO1.

The other electrodes ITO2 are disposed so as to cross the first electrodes ITO1 that are formed on the first transparent substrate SUB1. Unit pixels are formed at the crossing portions.

A light shield film (black matrix BM) consisting of a horizontal BM (BM(H)) and a vertical BM (BM(V)) is formed on the first transparent substrate SUB1. Each region that is enclosed by the horizontal BM (BM(H)) and the vertical BM (BM(V)) and has an area X×Y is a pixel region of one color (i.e., a unit pixel) corresponding to one color filter.

The semitransparent reflecting film T/R is made of the same material as used in the first to third embodiments, and is formed with slits SLT at positions corresponding to the gaps between the adjacent first electrodes ITO1. The slits SLT are charged with the light shield film BM and the light shield film BM separates the pixel regions.

The semitransparent reflecting film T/R has several light transmission apertures AP in each pixel region having the area X×Y. Although in this embodiment four circular light transmission apertures AP are formed in each pixel region, the number and the shape of light transmission apertures AP are arbitrary, as will be described later.

The light shield film BM can be formed by a photolithography technique in which a light shield material mixed with a photoresist is applied after formation of the slits SLT and the light transmission apertures AP and then back exposure is performed from the first transparent substrate SUB1 side to set and leave parts of the light shield material existing in the slits SLT.

In the above process, the light shield material is prevented from leaving in the light transmission apertures AP by covering the light transmission apertures AP with a proper mask during the exposure or during the application of the light shield material.

The liquid crystal LC that is interposed between the first transparent substrate SUB1 and the second transparent substrate SUB2 is an STN (super twisted nematic) liquid crystal.

In this embodiment, the color filters CF are formed on the second transparent substrate SUB2 by a photolithography process using a pigment-dispersed resist. However, the color filters CF may be formed by other known methods, such as a method in which coloring is performed by using dyes as dyeing agents, an ink jetting method, and a method of attaching color sheets on which three colors are printed in advance.

The overcoat layers OC1 and OC2 are provided for such purposes as preventing deterioration in the quality of the semitransparent reflecting film T/R, the light shield film BM, the color filters CF, and the material of the liquid crystal LC and securing uniform alignment of the liquid crystal LC by planarizing the surfaces. Examples of the material of the overcoat layers OC1 and OC2 are a thermosetting acrylic resin, an urethane resin, a polyglycidyl methacrylate resin, and a silica-type inorganic material.

As described above, according to the embodiment, the light transmission apertures AP are formed in the semitransparent reflecting film T/R, whereby the luminance in the transmission light mode is increased. The circular shape of the light transmission apertures AP minimizes a variation in forming the semitransparent reflecting film T/R by photolithography and etching, whereby the area of the light transmission apertures AP can be uniformized easily.

Since the slits SLT are formed in the semitransparent reflecting film T/R at the positions corresponding to the gaps between the first electrodes ITO1 operating as the pixel electrodes (i.e., the gaps between the adjacent pixel regions: slits) and the slits SLT are charged with the light shield film BM, when a backlight that is provided on the back side of the liquid crystal display panel is turned on, leakage of light that is emitted from the backlight is prevented and light beams of adjacent pixel regions can be separated from each other, leading to increase in contrast.

FIGS. 5A–5D show other exemplary shapes and arrangements of light transmission apertures AP that are formed in the semitransparent reflecting film T/R of the liquid crystal display panel according to the invention. A unit pixel portion (X×Y) of the semitransparent reflecting film T/R is shown in FIGS. 5A–5D.

Although in each of the above embodiments the light transmission apertures AP that are formed in the semitransparent reflecting film TIR are circular apertures from the viewpoint of processing accuracy, the invention is not limited to such a case. A feature of the invention resides in that parts of light emitted from an illumination light source that is provided on the back side of the first transparent substrate SUB1 are input to the liquid crystal LC through the pixel regions.

Therefore, in principle, the light transmission apertures AP that are formed in the semitransparent reflecting film T/R may be of any shape. The light transmission apertures AP can be formed by not only a photolithography technique, but also known precision processing techniques such as laser processing.

Figures 5A, 5B, 5C, 5D:
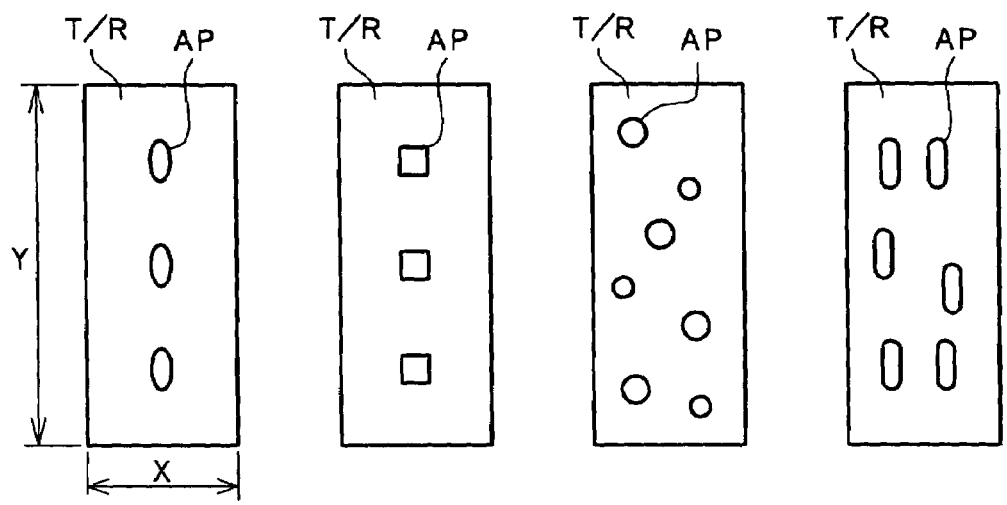
FIGS. 5A–5D are diagrams which show other exemplary shapes and arrangements of light transmission apertures that are formed in a semitransparent reflecting film of the liquid crystal display panel according to the invention.

FIG. 5A shows a case where the light transmission apertures AP have an elliptical shape. FIG. 5B shows a case where they have a square shape. FIG. 5C shows a case where circular apertures having the same size or different sizes are not arranged in line, but are staggered. FIG. 5D shows a case where slit-shaped light transmission apertures AP are arranged.

The above shapes and arrangements of the light transmission apertures AP may be combined with each other. A proper number of light transmission apertures AP having a proper shape may be arranged in a proper manner in accordance with the electrode shape and the size of the liquid crystal display panel.

Each of the above embodiments can increase the reflection light quantity in the reflection light mode and the transmission light quantity in the transmission light mode, and can provide liquid crystal display panels that have increased brightness and contrast.

A light shield film BM may be formed between the color filters FC of the respective colors that are formed on the second transparent substrate SUB2. Such a light shield film BM may be made of chromium, chromium oxide, a black resist called resin black, or a like material.

Next, specific exemplary structures of the liquid crystal display panel according to the invention and the liquid crystal display device using it will be described. However, the invention is not limited to the structures described below.

Figure 6:
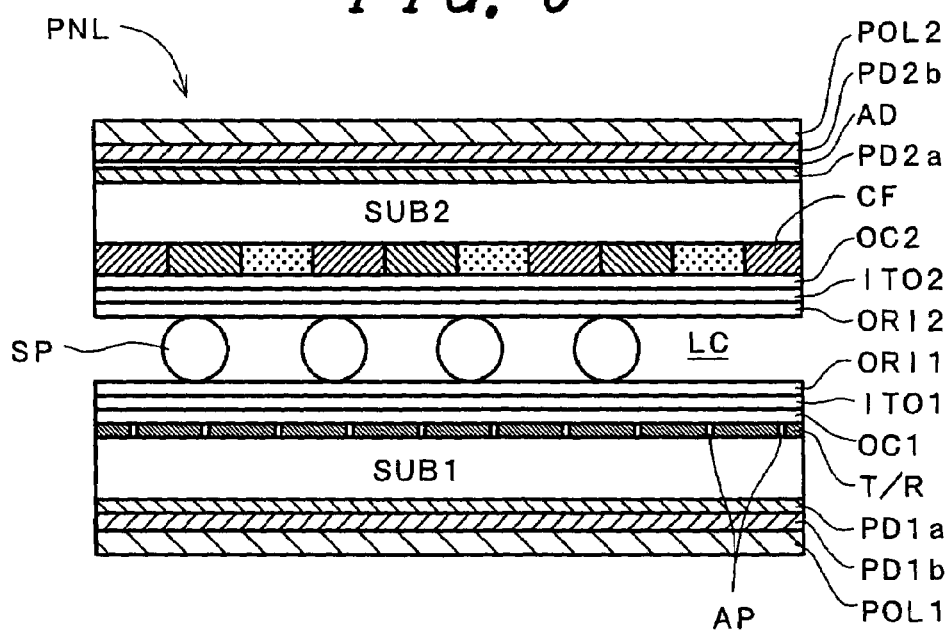
FIG. 6 is a schematic sectional view of a semi-transmission/reflection-type liquid crystal display panel.

FIG. 6 is a schematic sectional view of a semi-transmission/reflection-type liquid crystal display panel corresponding to the first embodiment of the invention, that was described above with reference to FIGS. 1A and 1B.

A first lower phase plate PD1a, a second lower phase plate PDIb, and a lower polarizer POLL are laid one on another in this order on the outside surface of the first transparent substrate SUB1. The first lower phase plate PD Ia is a $\lambda 4$ plate and its $\Delta$nd is equal to 140 nm (measurement wavelength: 550 nm).

The second lower phase plate PD Ib is a $\lambda 2$ plate and its $\Delta$nd is equal to 270 nm (measurement wavelength: 550 nm).

On the other hand, a second upper phase plate PD2b, a first upper phase plate PD2a, and an upper polarizer POL2 are laid one on another in this order on the surface of the second transparent substrate SUB2. The second upper phase plate PD2b and the first upper phase plate PD2a are bonded together with an adhesive layer AD containing a light diffusing agent.

The bonding gap between the first transparent substrate SUB1 and the second transparent substrate SUB2, that is, the cell gap of the liquid crystal LC, is maintained by spacers SP, such as polymer beads. The spacers SP may be pole-like spacers that are fixedly formed on the inside surface of the first transparent substrate SUB1 or the second transparent substrate SUB2. Spacers SP may be omitted if the cell gap can be maintained by another means.

Figure 7:
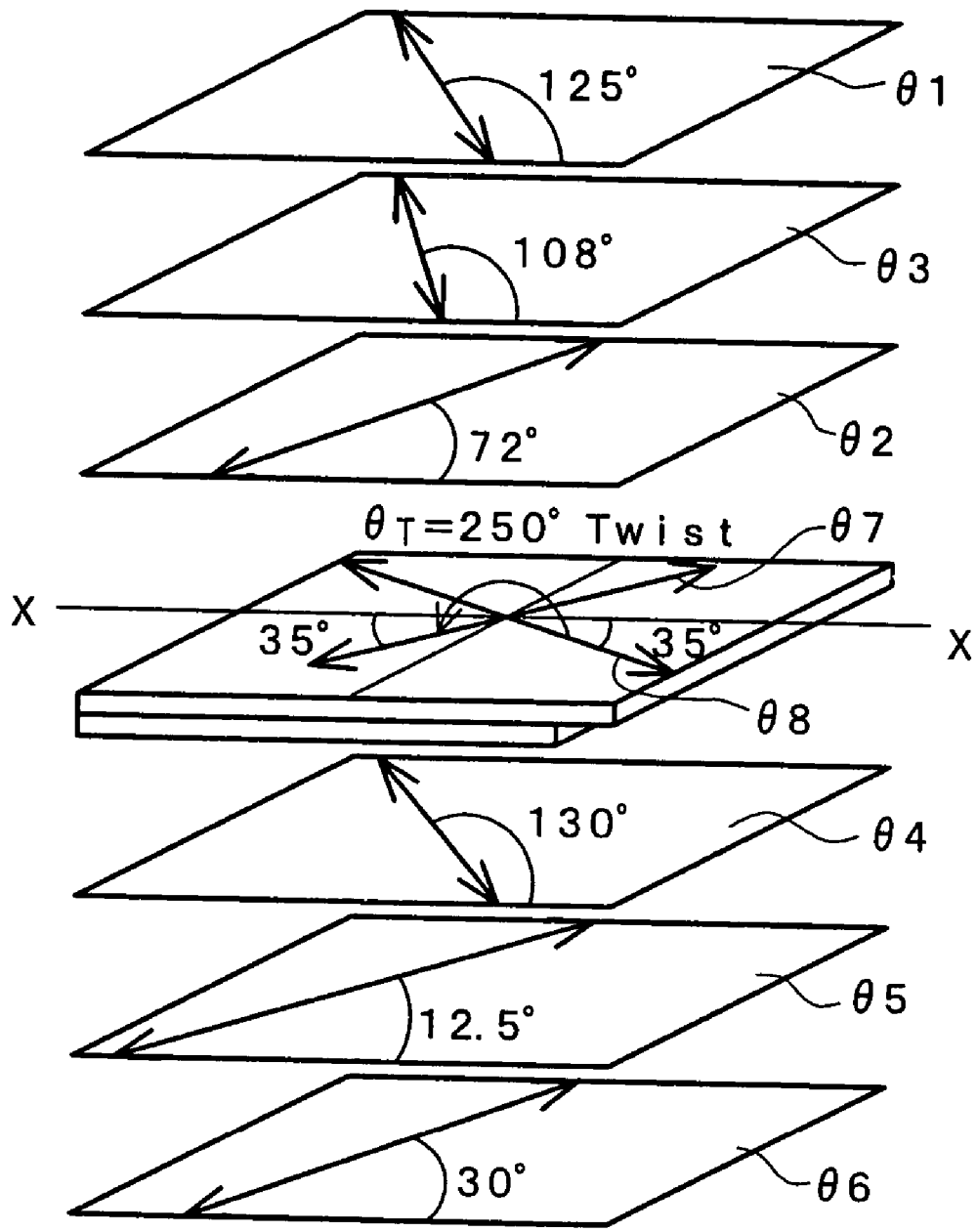
FIG. 7 is a schematic diagram showing the arrangement of optic axes of the liquid crystal display panel shown in FIG. 6.

FIG. 7 is a schematic diagram showing the arrangement of optic axes of the liquid crystal display panel shown in FIG. 6. The directions of optic axes (optical absorption axes (also referred to simply as "absorption"), drawing axes, alignment axes, etc.) of the respective members constituting the liquid crystal display panel are indicated by arrows in respective layers. Angles are measured counterclockwise with respect to the reference line X—X (corresponds to the horizontal direction of the screen).

In FIG. 7, the absorption axis of the upper polarizer POL2 has an angle 01 that is equal to 125°. The drawing axis of the second upper phase plate PD2b has an angle $\theta 3$ that is equal to 108°. The drawing axis of the first upper phase plate PD2a has an angle $\theta 2$ that is equal to 72°. The drawing axis $\theta 4$ of the first lower phase plate PSIa has an angle $\theta 4$ that is equal to 130°. The drawing axis of the second lower phase plate PD1b has an angle $\theta 5$ that is equal to 12.5°. The absorption axis of the lower polarizer POLI has an angle $\theta 6$ that is equal to 30°.

The alignment axis of the lower alignment layer ORI1 that is formed on the first transparent substrate SUB1 has an angle $\theta 7$ that is equal to 35°. The alignment axis of the upper alignment layer ORI2 that is formed on the second transparent substrate SUB2 has an angle $\theta 8$ that is equal to 35°. The twist angle $\theta_T$ of the liquid crystal LC is greater than 240° and is written as 250° in FIG. 7.

Figure 8:
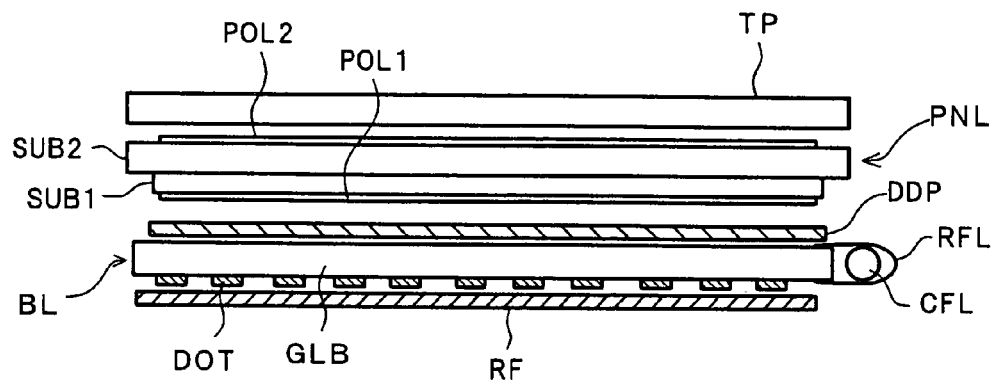
FIG. 8 is a schematic sectional view showing the configuration of air exemplary personal digital assistant incorporating a touch panel that uses the liquid crystal display panel according to the invention.

FIG. 8 is a schematic sectional view showing the configuration of an exemplary personal digital assistant incorporating a touch panel that uses the liquid crystal display panel according to the invention. This personal digital assistant is equipped with the above-described semi-transmission/reflection-type liquid crystal display panel PNL and an illumination light source, that is, a backlight BL.

The backlight BL is formed on the back surface of the liquid crystal display panel PNL. In a dark environment, illumination light that is emitted from the backlight BL is modulated in accordance with image signals being applied to the liquid crystal display panel PNL in passing through the liquid crystal display panel PNL. The image signals are visualized when the illumination light is output to the display screen side of the liquid crystal display panel PNL. In a bright environment, the liquid crystal display panel PNL operates as a reflection-type liquid crystal display panel that uses, as illumination light, ambient light that enters the liquid crystal display panel PNL from the display screen side.

A touch panel TP that enables manual writing input by pressing it with the tip of a pen or the like is formed on the display screen of the liquid crystal display panel PNL. Information is input through the display screen of the liquid crystal display panel PNL by using the touch panel TP.

That is, the liquid crystal display panel PNL has, on its back surface, the backlight BL that is composed of an approximately rectangular, transparent light guide plate GLB, a lamp CFL that is disposed along one periphery of the light guide plate GLB, and a lamp reflection sheet RFL. In the transmission display mode, light emitted from the backlight BL is directed to the liquid crystal display panel PNL as it travels through the light guide plate GLB, and it illuminates the liquid crystal display panel PNL from the back side. Dots DOT or the like are formed on the back surface of the light guide plate GLB by printing or the like, whereby uniform luminance is obtained over the entire area of the liquid crystal display panel PNL.

A reflection plate RF for returning, to the liquid crystal display panel. PNL, light that is output from the light guide plate GLB to the back side by fully reflecting it is provided on the back side of the light guide plate GLB.

The backlight BL is attached to the liquid crystal display panel PNL with a light quantity profile correcting member, such as a light diffusing film DDP or a prism plate (not shown) interposed in between.

Other light sources such as light-emitting diodes may be used in place of the lamp CFL.

Figure 9:
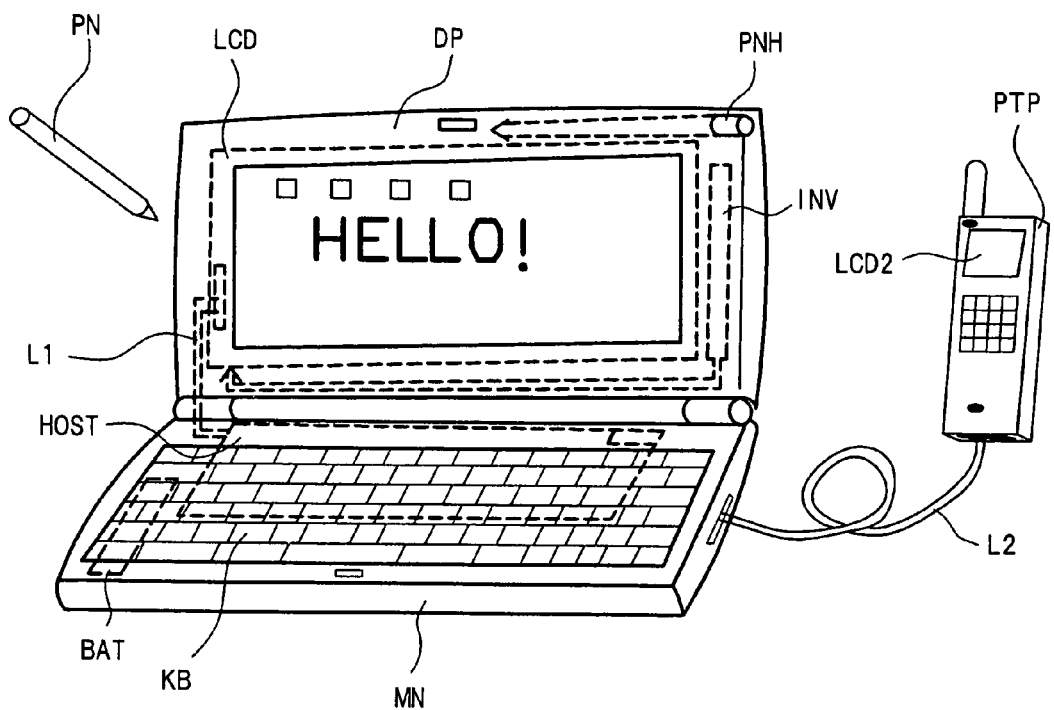
FIG. 9 is a perspective view showing the configuration of an exemplary portable digital assistant that is an electronic apparatus incorporating the liquid crystal display device according to the invention.

FIG. 9 is a perspective view showing the configuration of an exemplary portable digital assistant (PDA) that is an electronic apparatus incorporating the liquid crystal display device according to the invention. The portable digital assistant is composed of a main body MN that accommodates a host computer HOST and a battery BAT and has a keyboard KB on its surface and a display section DP that incorporates a liquid crystal display device LCD and an inverter INV for a backlight.

A cellular phone PTP can be connected to the main body MN via a connection cable L2, whereby communication with a person at a distant place is enabled.

The liquid crystal display device LCD of the display section DP is connected to the host computer HOST via an interface cable L1.

The display section DP has a pen holder PNH for accommodating an input pen PN.

The liquid crystal display device allows a user to input information through the keyboard KB, to input various kinds of information by pressing the surface of the touch panel, tracing a pattern displayed thereon, or writing characters etc. thereon with the input pen PN, to select from pieces of information or processing functions displayed on the liquid crystal display device PNL, and to perform other various manipulations.

The shape and the configuration of this type of portable digital assistant is not limited to the illustrated ones. Portable digital assistants having other various shapes, configurations and functions can be constructed.

By using the liquid crystal display panel according to the invention as a liquid crystal display panel LCD2 that is used in the display section of the cellular phone PTP shown in FIG. 9, the cellular phone PTP can perform color data display that is highly legible.

As described above, according to the invention, in a semi-transmission/reflection-type liquid crystal display panel capable of always displaying a bright, clear full-color image irrespective of the brightness of an environment by selecting the reflection light mode in a bright environment and the transmission light mode in a dark environment, bright, high-contrast image display as well as good color display is enabled in each of the transmission light mode and the reflection light mode.

What is claimed is:

1. A liquid crystal display device comprising:
   a first transparent substrate having a plurality of electrodes;
   a second transparent substrate;
   a liquid crystal interposed between the first transparent substrate and the second transparent substrate;
   an illumination light source disposed on a back side of the first transparent substrate;
   pixel regions arranged in a matrix; and
   a reflecting film formed between the first transparent substrate and the electrodes, the reflecting film having at least one light transmission aperture in each pixel region and without slits at positions corresponding to gaps between adjacent ones of the pixel regions;
   wherein the second transparent substrate has color filter layers, and wherein peripheral portions of adjacent ones of the color filter layers overlap with each other at positions corresponding to the gaps between adjacent ones of the pixel regions.

2. A liquid crystal display device according to claim 1, wherein the reflecting film is an opaque reflecting film.

3. A liquid crystal display device according to claim 1, wherein the reflecting film is a semitransparent reflecting film.

4. A liquid crystal display device comprising:
   a first transparent substrate having a plurality of electrodes;
   a second transparent substrate;
   a liquid crystal interposed between the first transparent substrate and the second transparent substrate;
   an illumination light source disposed on a back side of the first transparent substrate;
   pixel regions arranged in a matrix;
   a reflecting film formed between the first transparent substrate and the electrodes, the reflecting film having at least one light transmission aperture in each pixel region and slits at positions corresponding to gaps between adjacent ones of the pixel regions; and
   a light absorption film formed between the first transparent substrate and the reflecting film at positions corresponding to the slits.

5. A liquid crystal display device according to claim 4, wherein the reflecting film is an opaque reflecting film.

6. A liquid crystal display device according to claim 4, wherein the reflecting film is a semitransparent reflecting film.

7. A liquid crystal display device comprising:
   a first transparent substrate having a plurality of electrodes;
   a second transparent substrate;
   a liquid crystal interposed between the first transparent substrate and the second transparent substrate;
   an illumination light source disposed on a back side of the first transparent substrate;
   pixel regions arranged in a matrix;
   a reflecting film formed between the first transparent substrate and the electrodes, the reflecting film having at least one light transmission aperture in each pixel region and slits at positions corresponding to gaps between adjacent ones of the pixel regions; and
   a light absorption film with which the slits are charged.

8. A liquid crystal display device according to claim 7, wherein the reflecting film is an opaque reflecting film.

9. A liquid crystal display device according to claim 7, wherein the reflecting film is a semitransparent reflecting film.

10. A liquid crystal display device according to claim 7, wherein a surface of the light absorption film is disposed at a height which is substantially at a height of a surface of the reflecting film.

* * * * *